(12) United States Patent
Kong et al.

(10) Patent No.: US 9,972,834 B2
(45) Date of Patent: May 15, 2018

(54) CATHODE ACTIVE MATERIAL FOR LITHIUM SECONDARY BATTERY AND METHOD FOR MANUFACTURING THE SAME

(71) Applicant: LG Chem, Ltd., Seoul (KR)

(72) Inventors: Woo-Yeon Kong, Daejeon (KR); Myung-Ki Lee, Daejeon (KR); Min-Suk Kang, Daejeon (KR); Sun-Sik Shin, Daejeon (KR); Hye-Lim Jeon, Daejeon (KR); Chi-Ho Jo, Daejeon (KR); Geun-Gi Min, Daejeon (KR); Wang-Mo Jung, Daejeon (KR)

(73) Assignee: LG Chem, Ltd. (KR)

( * ) Notice: Subject to any disclaimer, the term of this patent is extended or adjusted under 35 U.S.C. 154(b) by 284 days.

(21) Appl. No.: 14/438,025

(22) PCT Filed: Jun. 18, 2014

(86) PCT No.: PCT/KR2014/005375
§ 371 (c)(1),
(2) Date: Apr. 23, 2015

(87) PCT Pub. No.: WO2014/204213
PCT Pub. Date: Dec. 24, 2014

(65) Prior Publication Data
US 2015/0287984 A1  Oct. 8, 2015

(30) Foreign Application Priority Data

Jun. 18, 2013  (KR) .................. 10-2013-0069947
Jun. 18, 2014  (KR) .................. 10-2014-0074346

(51) Int. Cl.
| | | |
|---|---|---|
| H01M 4/36 | (2006.01) | |
| H01M 4/1315 | (2010.01) | |
| H01M 4/525 | (2010.01) | |
| H01M 4/04 | (2006.01) | |
| H01M 4/13915 | (2010.01) | |
| H01M 4/505 | (2010.01) | |
| H01M 4/131 | (2010.01) | |
| H01M 4/1391 | (2010.01) | |
| C01G 53/00 | (2006.01) | |
| H01M 4/139 | (2010.01) | |
| H01M 4/02 | (2006.01) | |
| H01M 10/052 | (2010.01) | |

(52) U.S. Cl.
CPC .......... *H01M 4/366* (2013.01); *C01G 53/50* (2013.01); *H01M 4/0419* (2013.01); *H01M 4/0421* (2013.01); *H01M 4/0471* (2013.01); *H01M 4/131* (2013.01); *H01M 4/139* (2013.01); *H01M 4/1315* (2013.01); *H01M 4/1391* (2013.01); *H01M 4/13915* (2013.01); *H01M 4/505* (2013.01); *H01M 4/525* (2013.01); *C01P 2002/20* (2013.01); *C01P 2004/03* (2013.01); *C01P 2004/80* (2013.01); *C01P 2006/40* (2013.01); *H01M 10/052* (2013.01); *H01M 2004/021* (2013.01); *H01M 2004/028* (2013.01); *H01M 2220/20* (2013.01); *Y02E 60/122* (2013.01); *Y02P 70/54* (2015.11)

(58) Field of Classification Search
CPC ...... H01M 4/366; H01M 4/131; H01M 4/525; H01M 4/505; H01M 10/052; H01M 2004/028; H01M 2220/20; Y02E 60/122; C01G 53/50
See application file for complete search history.

(56) References Cited

U.S. PATENT DOCUMENTS

| | | |
|---|---|---|
| 2009/0087362 A1 | 4/2009 | Sun et al. |
| 2011/0244331 A1 | 10/2011 | Karthikeyan et al. |
| 2012/0270104 A1 | 10/2012 | Paulsen et al. |
| 2013/0330612 A1 | 12/2013 | Choi et al. |
| 2014/0162127 A1 | 6/2014 | Kim et al. |
| 2014/0242463 A1 | 8/2014 | Song et al. |
| 2015/0050552 A1 | 2/2015 | Matsuyama et al. |

FOREIGN PATENT DOCUMENTS

| | | |
|---|---|---|
| JP | 2013524440 A | 6/2013 |
| JP | 2014116308 A | 6/2014 |
| KR | 20030091581 A | 12/2003 |
| KR | 20050049746 A | 5/2005 |
| KR | 100822013 B1 | 4/2008 |
| KR | 20120093983 A | 8/2012 |
| KR | 20120118435 A | 10/2012 |
| KR | 20120130716 A | 12/2012 |

(Continued)

OTHER PUBLICATIONS

International Search Report for Application No. PCT/KR2014/005375 dated Oct. 28, 2014.

(Continued)

*Primary Examiner* — Laura Weiner

(74) *Attorney, Agent, or Firm* — Lerner, David, Littenburg, Krumholz & Mentlik, LLP

(57) ABSTRACT

The present disclosure relates to a cathode active material for a lithium secondary battery with improved rate characteristics in which a spinel surface structure is formed by fluorine coating on a surface of layered lithium nickel-manganese-cobalt cathode active material and a method for manufacturing the same, and according to the present disclosure, there is provided a lithium secondary battery with improved rate characteristics that may be charged to a capacity close to a full charge in a short time when compared to a related art and thus is suitable for high capacity of a secondary battery.

11 Claims, 5 Drawing Sheets

(56) References Cited

FOREIGN PATENT DOCUMENTS

| WO | 2008069351 | A1 | 6/2008 |
| WO | 2013048048 | A2 | 4/2013 |
| WO | 2013073231 | A1 | 5/2013 |

OTHER PUBLICATIONS

Sun, Yang-Kook, et al., "The Role of AlF3 Coatings in Improving Electrochemical Cycling of Li-Enriched Nickel-Manganese Oxide Electrodes for Li-Ion Batteries." Advanced Materials, vol. 24, No. 9, Feb. 24, 2002, pp. 1192-1196, XP055266279, DE.
Extended Search Report from European Application No. 14814161.7, dated Apr. 28, 2016.

CATHODE ACTIVE MATERIAL FOR LITHIUM SECONDARY BATTERY AND METHOD FOR MANUFACTURING THE SAME

CROSS-REFERENCE TO RELATED APPLICATIONS

The present application is a national phase entry under 35 U.S.C. § 371 of International Application No. PCT/KR2014/005375 filed Jun. 18, 2014, published in Korean, which claims priority from Korean Application No. 10-2013-0069947 filed Jun. 18, 2013 and Korean Application No. 10-2014-0074346 filed Jun. 18, 2014, all of which are hereby incorporated herein by reference.

TECHNICAL FIELD

The present disclosure relates to a cathode active material for a lithium secondary battery and a method for manufacturing the same, and more particularly, to a cathode active material for a lithium secondary battery with improved rate characteristics and a method for manufacturing the same.

BACKGROUND ART

With the technology development and the growing demands for mobile devices, the demand for secondary batteries as an energy source is dramatically increasing, and among the secondary batteries, a lithium secondary battery having high energy density and operating potential, a long cycle life, and a low self-discharging rate has been commercialized and is being widely used.

Also, recently, with the growing interest in environmental issues, many studies are being conducted on electric vehicles (EVs) and hybrid electric vehicles (HEVs) other than vehicles running on fossil fuels, such as gasoline vehicles and diesel vehicles, attributable to air pollution.

Electric vehicles (EVs) and hybrid electric vehicles (HEVs) use Ni-MH secondary batteries or lithium secondary batteries having a high energy density, a high discharge voltage and output stability as a power source, and when a lithium secondary battery is used in an electric vehicle, the lithium secondary battery needs to be used for ten or more years under a severe condition along with a high energy density and capability of providing a high output in a short time, and thus is necessarily required to have much better stability and long-term life characteristics than an existing small-sized lithium secondary battery. Also, a secondary battery in use for an electric vehicle (EV) and a hybrid electric vehicle (HEV) needs to be excellent in rate characteristics and power characteristics based on an operating condition of the vehicle.

Currently, as a cathode active material of a lithium ion secondary battery, lithium-containing cobalt oxide such as $LiCoO_2$ of a layered structure, lithium-containing nickel oxide such as $LiNiO_2$ of a layered structure, and lithium-containing manganese oxide such as $LiMn_2O_4$ of a spinel crystal structure are being used.

$LiCoO_2$ has excellent material properties including excellent cycle characteristics and is being widely used at present, but has low safety and because cobalt as a raw material is a finite resource, is costly and insufficient to use in large amounts as a power source in the field of industries such as electric vehicles. According to characteristics of a manufacturing method, applying $LiNiO_2$ to a mass production process at a reasonable cost is impractical.

In contrast, lithium manganese oxide such as $LiMnO_2$ and $LiMn_2O_4$ has an advantage of using manganese noted for an abundant and eco-friendly resource as a raw material, and thus is attracting much attention as an alternative cathode active material to $LiCoO_2$. However, these exemplary lithium manganese oxides have also a shortcoming of poor cycle characteristics. $LiMnO_2$ has a drawback of low initial capacity and in that several tens of charging and discharging cycles are needed until it reaches a predetermined capacity. Also, $LiMn_2O_4$ experiences a serious capacity reduction during cycles, and particularly, has a disadvantage of drastic degradation in cycle characteristics due to decomposition of an electrolyte solution and manganese release at high temperature higher than or equal to 50° C.

In this context, lithium nickel-manganese-cobalt-based composite oxide of a layered structure is proposed as a good active material having excellent battery performance balance while overcoming or minimizing the problems of each cathode active material. However, lithium nickel-manganese-cobalt-based composite oxide of a layered structure needs improvements of, in particular, rate characteristics for a wide range of applications.

DISCLOSURE

Technical Problem

The present disclosure is designed to solve the problem of the related art, and therefore, the present disclosure is directed to providing a lithium nickel-manganese-cobalt cathode active material for a lithium secondary battery with improved rate characteristics.

Also, the present disclosure is directed to providing a method for manufacturing the above cathode active material.

Technical Solution

According to an aspect of the present disclosure, there is provided a lithium nickel-manganese-cobalt cathode active material for a lithium secondary battery, wherein the lithium nickel-manganese-cobalt cathode active material has a layered structure and a fluorine-coated surface, and the fluorine-coated surface has a spinel-like phase.

The lithium nickel-manganese-cobalt cathode active material may be any cathode active material having a composition higher than or equal to 50 wt % of Mn among nickel, manganese, and cobalt, and its non-limiting example may be represented by the following general formula 1, but is not limited thereto:

  [General Formula 1]

where z>y, z>1-y-z≥0, and x≥1.

Alternatively, a non-limiting example of the lithium nickel-manganese-cobalt cathode active material may be represented by the following general formula 2:

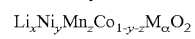  [General Formula 2]

where z>y, z>1-y-z≥0, x≥1, 0≤α≤1, and M is at least one metal selected from the group consisting of B, Li, Mg, Al, Ca, Sr, Cr, V, Ti, Fe, Co, Ni, Zr, Zn, Si, Y, Nb, Ga, Sn, Mo, W, and combinations thereof.

In the above formula, z≥0.5.

The lithium nickel-manganese-cobalt cathode active material may have a secondary grain size of a longest diameter from 20 nm to 200 μm.

The fluorine-coated surface may have a thickness from 2 nm to 20 μm.

In the general formula 1, a z/y value representing an Mn/Ni atomic ratio may be $1<z/y\leq 20$.

The fluorine coating may be made by a compound selected from the group consisting of polyvinylidene fluoride (PVdF), $AlF_3$, $NH_4F$, CsF, KF, LiF, NaF, RbF, TiF, AgF, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_2$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, $WF_6$, fluorine-containing gas, and mixtures thereof.

According to another aspect of the present disclosure, there is provided a method for manufacturing a lithium nickel-manganese-cobalt cathode active material for a lithium secondary battery, including (a) uniformly mixing a nickel compound, a manganese compound, and cobalt compound, (b) adding a lithium compound to a resultant of (a) and performing a baking treatment to obtain a layered lithium nickel-manganese-cobalt cathode active material, and (c) coating fluorine on a surface of the layered lithium nickel-manganese-cobalt cathode active material so that the fluorine coated surface has a spinel-like phase.

The fluorine coating may be performed by a solid state reaction method using heat treatment, a spray drying method, or a vapor reaction method.

According to another aspect of the present disclosure, there is provided a cathode for a lithium secondary battery manufactured from a cathode mix slurry including the above lithium nickel-manganese-cobalt cathode active material for a lithium secondary battery.

According to another aspect of the present disclosure, there is provided a lithium secondary battery including a cathode, an anode, a separator interposed between the cathode and the anode, and an electrolyte solution, wherein the cathode is the above cathode for a lithium secondary battery.

According to another aspect of the present disclosure, there is provided a battery module including the above lithium secondary battery as a unit cell.

According to another aspect of the present disclosure, there is provided a battery pack including the above battery module as a power source of a medium and large-sized device.

The medium and large-sized device may be an electric vehicle, a hybrid electric vehicle, a plug-in electric vehicle, or an energy storage system.

Advantageous Effects

According to the present disclosure, a lithium secondary battery with improved rate characteristics that may be charged to a capacity close to a full charge in a short time when compared to a related art is provided. The lithium secondary battery is adequate for high capacity and suitable for use as a power source of a medium- or large-sized device.

BEST MODE FOR CARRYING OUT THE INVENTION

Hereinafter, the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

A layered lithium nickel-manganese-cobalt cathode active material of the present disclosure is surface-coated with fluorine.

The layered lithium nickel-manganese-cobalt cathode active material may be any cathode active material having a composition higher than or equal to 50 wt % of Mn among nickel, manganese, and cobalt, and its non-limiting example may be represented by the following general formula 1, but is not limited thereto.

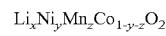   [General Formula 1]

where $z>y$, $z>1-y-z\geq 0$, $x\geq 1$.

In the general formula 1, a z/y value representing a Mn/Ni atomic ratio is preferably $1<z/y\leq 20$. When the z/y value is higher than the upper limit, safety may significantly reduce, and when the z/y value is lower than the lower limit, it is difficult to expect a high capacity.

Alternatively, a non-limiting example of the layered lithium nickel-manganese-cobalt cathode active material according to an aspect of the present disclosure may be represented by the following general formula 2:

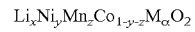   [General Formula 2]

where $z>y$, $z>1-y-z\geq 0$, $x\geq 1$, $0\leq \alpha\leq 1$, and M is at least one metal selected from the group consisting of B, Li, Mg, Al, Ca, Sr, Cr, V, Ti, Fe, Co, Ni, Zr, Zn, Si, Y, Nb, Ga, Sn, Mo, W, and combinations thereof.

Also, a z/y value representing a Mn/Ni atomic ratio is preferably $1<z/y\leq 20$.

Also, in the above general formulas 1 and 2, $z\geq 0.5$ is preferred.

The lithium nickel-manganese-cobalt cathode active material may have a grain size of a longest diameter from 20 nm to 200 μm, but is not limited thereto.

Figure 1A:
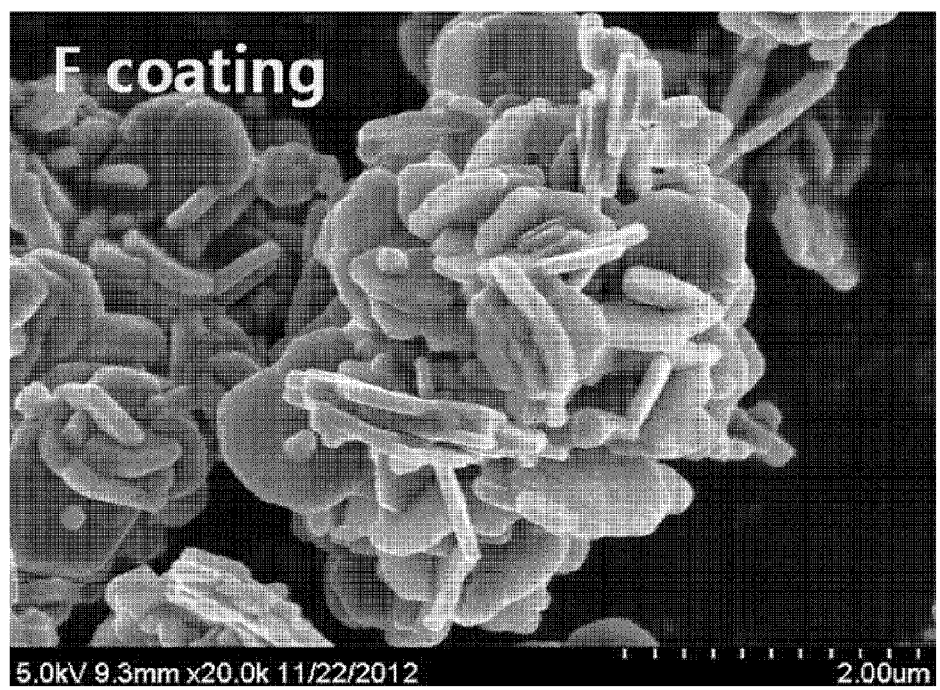
FIG. 1a is a scanning electron microscope (SEM) image of a cathode active material according to Embodiment example 1.
Figure 1B:
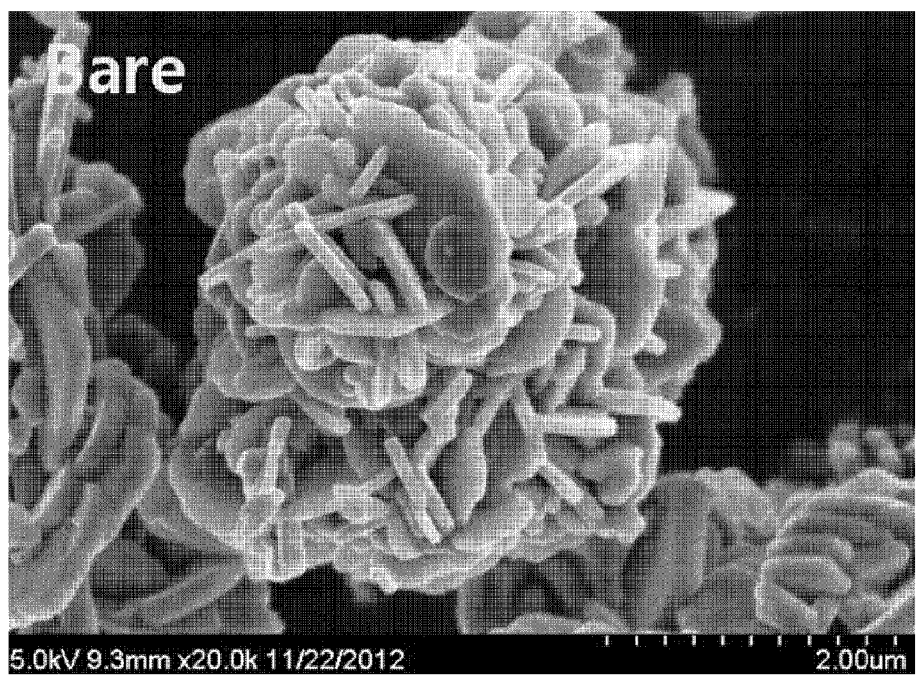
FIG. 1b is an SEM image of a cathode active material according to Comparative example 1.

The fluorine coating is applied to the surface of the layered lithium nickel-manganese-cobalt cathode active material, namely, a target material for coating, to create a reducing environment when baking so that the surface of the cathode active material may form a spinel-like phase. In regards to this, reference is made to FIGS. 1a and 1b; FIG. 1a is a scanning electron microscope (SEM) image of a fluorine-coated cathode active material according to an aspect of the present disclosure, and FIG. 1b is an SEM image of the cathode active material before fluorine coating, and in the SEM images, the lithium nickel-manganese-cobalt cathode active material has a flake form. Generally, a surface structure of dot form or other form appears on the surface of a cathode active material after fluorine coating, but the lithium nickel-manganese-cobalt cathode active material according to an aspect of the present disclosure has an advantage of being less attacked from an electrolyte solution because a protective coating is formed by a uniform or nearly uniform fluorine coating provided on the cathode active material particles.

A principle of forming the spinel-like phase by applying fluorine onto the surface of the layered cathode active material of General Formula 1 is not yet clarified, but is figured out by experiment results. Moreover, by the fluorine coating of the cathode active material, the influence on acid produced near the cathode active material decreases, or reactivity of the cathode active material with an electrolyte solution is suppressed, so a phenomenon in which the battery capacity drastically reduces may be resolved, and consequently, charging/discharging characteristics, life characteristics, a high voltage and high rate characteristics, and thermal safety may be improved. In particular, the cathode active material having the spinel-like phase surface structure according to an aspect of the present disclosure is advantageous in improving the rate characteristics, compared to a cathode active material having gone through fluorine coating without modifying a surface structure.

Examples of fluorine containing compounds used in the fluorine coating include, but are not limited to, polyvinylidene fluoride (PVdF), $AlF_3$, $NH_4F$, CsF, KF, LiF, NaF, RbF, TiF, AgF, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, $WF_6$, and fluorine-containing gas.

The fluorine coated surface may have a thickness from 2 nm to 20 µm or from 2 nm to 5 µm, but is not limited thereto. When the fluorine coated surface is thinner than the lower limit, a spinel-like phase may not be properly formed, and when the fluorine coated surface is thicker than the upper limit, movement of Li ions may be unfavorable and many side reactions with an electrolyte solution may occur.

Also, the content of the fluorine coating may be from 0.01 to 8 wt % or from 0.01 to 5 wt % based on the weight of the cathode active material. When the content of the fluorine coating is less than the lower limit, modification to a layered spinel-like phase structure is not made on the surface of the cathode active material, and when the content of the fluorine coating is in excess beyond the upper limit, a relative ratio of the cathode active material reduces and a capacity or energy density reduces.

A method for manufacturing lithium nickel-manganese-cobalt-based composite oxide for a lithium secondary battery according to the present disclosure may include, but is not limited to the following steps of:

(a) uniformly mixing a nickel compound, a manganese compound, and cobalt compound;

(b) adding a lithium compound to a resultant of (a) and performing a baking treatment to obtain a layered lithium nickel-manganese-cobalt cathode active material; and (c) coating fluorine on the surface of the layered lithium nickel-manganese-cobalt cathode active material so that the fluorine coated surface has a spinel-like phase.

The nickel compound may include, for example, $Ni(OH)_2$, NiO, NiOOH, $NiCO_3.2Ni(OH)_2.4H_2O$, $NiC_2O_4.2H_2O$, $Ni(NO_3)_2.6H_2O$, $NiSO_4$, $NiSO_4.6H_2O$, nickel salt of fatty acid, and nickel halide. Among them, a nickel compound not including a nitrogen or sulfur atom during baking treatment, such as $Ni(OH)_2$, NiO, NiOOH, $NiCO_3.2Ni(OH)_2.4H_2O$, and $NiC_2O_4.2H_2O$, is preferred in that it does not produce a harmful substance such as $NO_x$ and $SO_x$ during a baking process. Such nickel compounds may be used singularly or in combination.

The manganese compound may include, for example, manganese oxide such as $Mn_2O_3$, $MnO_2$, and $Mn_3O_4$, $MnCO_3$, $Mn(NO_3)_2$, $MnSO_4$; manganese salt such as manganese acetate, manganese(II) dicarboxylate, manganese citrate, and manganese salt of fatty acid; and halide such as manganese chloride. Among them, $MnO_2$, $Mn_2O_3$, and $Mn_3O_4$ are preferred, and this is because they are available as an industrial raw material at a low cost while not producing $No_x$ and $SO_x$ and gas such as $CO_2$ during baking treatment. Such manganese compounds may be used singularly or in combination.

The cobalt compound may include, for example, $Co(OH)_2$, CoOOH, CoO, $Co_2O_3$, $Co_3O_4$, $Co(OCOCH_3)_2.4H_2O$, $CoCl_2$, $Co(NO_3)_2.6H_2O$, and $Co(SO_4)_2.7H_2O$. Among them, $Co(OH)_2$, CoOOH, CoO, $Co_2O_3$, and $Co_3O_4$ are preferred in that they do not produce a harmful substance such as $NO_x$ and $SO_x$ during baking treatment. $Co(OH)_2$ and CoOOH are more preferred from the perspective of a low cost in the industrial aspect and high reactivity. Such cobalt compounds may be used singularly or in combination.

A method of mixing the raw materials is not limited to a particular one, and the raw materials may be mixed by a wet or dry process. For example, a method using a machine such as a ball mill, a vibratory mill, and a bead mill may be contemplated. The wet mixing is preferred because it allows for more uniform mixing and increased reactivity of a mixture in a baking process.

A mixing time may change based on a mixing method. However, so long as the raw materials are uniformly mixed at a particulate level, any mixing time may be used. For example, when mixing using a ball mill (wet or dry mixing), a mixing time is generally from about 1 hour to about two days, and when mixing using a bead mill (wet continuous method), a dwell time is generally from about 0.1 hour to about 6 hours.

After wet grinding, the particles are dried by a general method. A drying method is not limited to a particular one. However, in terms of uniformity of a particulate material to be produced, powder flowability and powder processing performance, and efficiency in forming spherical secondary particles, spray drying is preferred.

The powder obtained by spray drying is sufficiently mixed with lithium-containing compounds such as $Li_2CO_3$, $LiNO_3$, $LiNO_2$, LiOH, $LiOH.H_2O$, LiH, LiF, LiCl, LiBr, LiI, $CH_3OOLi$, $Li_2O$, $Li_2SO_4$, lithium dicarboxylate, lithium citrate, and lithium salt of fatty acid and alkyl lithium.

The resulting powder mixture is baked. A baking condition is determined based on a composition and lithium compound materials being used. A baking temperature is generally 800° C. or higher, preferably 900° C. or higher, more preferably 950° C. or higher, and generally 1100° C. or lower, preferably 1075° C. or lower, more preferably 1050° C. or lower.

Subsequently, a fluorine-containing compound is coated on the surface of the lithium nickel-manganese-cobalt cathode active material. A coating method may include, but is not limited to, for example, a solid phase reaction which performs heat treatment on the fluorine-containing compound and the cathode active material at a proper temperature, a spray drying method which dissolves the fluorine-containing compound in a solvent and disperses/sprays it, or a vapor reaction using gas. The solid phase reaction is advantageous in aspects of a process or costs, and may include a process of heat treatment at 300 to 600° C. for 5 to 10 hours.

The cathode active material of the present disclosure manufactured in this way may form a cathode mix with a binder and a conductive material generally used in the art.

The binder is a substance that aids the binding of the cathode active material and the conductive material etc. and the binding of the cathode active material to the current collector, and may be added in an amount of, for example, 1 to 30 parts by weight based on 100 parts by weight of the cathode active material, but its content is not specially limited in the present disclosure. The binder is not limited to a particular one, but may include, for example, polyvinylidene fluoride (PVdF), polytetrafluoroethylene (PTFE), fluororubber, styrene-butadiene rubber (SBR), and cellulose-based resin.

The conductive material may be added in an amount of, for example, 1 to 50 parts by weight based on 100 parts by weight of the cathode active material, but its content is not specially limited in the present disclosure. The conductive material is not limited to a specific type if it is conductive while not causing a chemical change in the battery in question, and may include, for example, a carbon black-based conductive material such as graphite or acetylene black.

A dispersant may be selected from the group consisting of N-methyl-2-pyrrolidone, diacetone alcohol, dimethylformaldehyde, propyleneglycol monomethylether, methyl cellosolve, ethyl cellosolve, butyl cellosolve, isopropyl cellosolve, acetylacetone, methyl isobutyl ketone, n-butyl acetate, cellosolve acetate, toluene, xylene, and mixtures thereof, but is not limited thereto.

The cathode mix slurry is coated on a cathode current collector and dried to form a cathode for a lithium secondary battery.

The cathode current collector generally has a thickness from 10 to 500 μm. The cathode current collector is not limited to a specific type if it has high conductivity while not causing a chemical change in the corresponding battery, and may be made from, for example, stainless steel, aluminum, nickel, titanium, baked carbon, or aluminum or stainless steel treated with carbon, nickel, titanium, or silver on the surface.

A thickness of the cathode mix slurry on the cathode current collector is not specially limited, and may be, for example, from 10 to 300 μm, and a loading amount of active materials may be 5 to 50 mg/cm$^2$.

According to another aspect of the present disclosure, there is provided a lithium secondary battery including a cathode, an anode, a separator interposed between the cathode and the anode, and an electrolyte solution, wherein the above cathode is used as the cathode.

Also, the lithium secondary battery may be fabricated by manufacturing an anode, a separator, and an electrolyte solution by a general method known in the art and assembling them with the cathode.

A non-limiting example of an anode active material may include a general anode active material usable in an anode of a conventional electrochemical cell, in particular, a lithium adsorption material such as a lithium metal or a lithium alloy, carbon, petroleum coke, activated carbon, graphite, or other carbons is preferred. An anode current collector may be, as a non-limiting example, a foil made from copper, gold, nickel or copper alloy, or combinations thereof.

For the separator, a polyolefin-based film of porous polyethylene and porous polypropylene, an organic/inorganic composite separator having a porous coating layer formed on a porous substrate, a non-woven film, and engineering plastic may be used, but is not limited thereto. As a process of applying the separator to a battery, a lamination/stacking process and a folding process as well as a winding process being generally used may be contemplated.

The electrolyte solution usable in an exemplary embodiment of the present disclosure may be an electrolyte solution in which a salt, for example, of $A^+B^-$ structure, where $A^+$ represents an alkali metal cation such as $Li^+$, $Na^+$ and $K^+$, or combinations thereof, and $B^-$ represents an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$, or combinations thereof, is dissolved or dissociated in an organic solvent including, but is not limited to, propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethylmethylcarbonate (EMC), gamma butyrolactone, or mixtures thereof.

Also, with an aim to improve the charging/discharging characteristics, retardancy, and the like, pyridine, triethylphosphite, triethanol amine, cyclic ether, ethylene diamine, n-glyme, hexamethyl phosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, and trichloro aluminium, for example, may be added to the electrolyte solution. According to circumstances, to impart non-flammable properties, a halogen containing solvent such as carbon tetrachloride and trifluoroethylene may be additionally included, and to improve the preserving characteristics at high temperature, carbon dioxide gas may be additionally included, and fluoro-ethylene carbonate (FEC), propene sultone (PRS), and fluoro-propylene carbonate (FPC) may be additionally included.

Injection of the electrolyte solution may be performed in a proper step among a battery fabrication process based on a manufacturing process and required physical properties of a final product. That is, injection of the electrolyte solution may be applied before battery assembling or in a final step of battery assembling.

The secondary battery according to the present disclosure may be not only used in a battery cell which may be used as a power source of a small device, but also used as a unit battery in a medium-large sized battery module including a plurality of battery cells.

Also, the present disclosure provides a battery pack including the battery module as a power source of a medium and large-sized device, and the medium and large-sized device may be used in an electric car including an electric vehicle (EV), a hybrid electric vehicle (HEV), and a plug-in hybrid electric vehicle (PHEV), an energy storage system, and the like.

MODE FOR CARRYING OUT THE INVENTION

Hereinafter, the present disclosure will be described in detail through embodiments. The embodiments of the present disclosure, however, may take several other forms, and the scope of the present disclosure should not be construed as being limited to the following embodiments. The embodiments of the present disclosure are provided to more fully explain the present disclosure to those having ordinary knowledge in the art to which the present disclosure pertains.

Embodiment Example 1: Manufacture of Cathode 100 g of layered lithium nickel-manganese-cobalt composite oxide $Li_aNi_{0.4}Mn_{0.6}O_2$ (1≤a<1.5) was mixed with 0.3 g of a fluorine containing compound PVdF, and heat treatment was performed at 500° C. for 5 to 10 hours. Fluorine-coated lithium nickel-manganese-cobalt composite oxide was obtained.

Subsequently, the lithium nickel-manganese-cobalt composite oxide was dissolved in a dispersant along with a conductive material and a binder to obtain a slurry, and the slurry was coated on an aluminum current collector and dried at temperature of 100 to 130° C. for 2 hours, to manufacture a cathode.

Embodiment Example 2: Manufacture of Lithium Secondary Battery

The cathode obtained in Embodiment example 1 was used as a cathode of a lithium secondary battery.

As an anode, a generally available Li metal was used.

As a separator, a polyethylene film was used, and the separator was interposed between the cathode and the anode, a solution including 1 mol $LiPF_6$ in a mixed solvent EC/DMC/EMC=3/4/3 was used as an electrolyte solution, and a battery was manufactured by a general manufacturing method.

Comparative Example 1: Manufacture of Cathode

A cathode was manufactured by the same method as Embodiment example 1 except non-fluorine-coated layered lithium nickel-manganese-cobalt composite oxide was used.

Comparative Example 2: Manufacture of Lithium Secondary Battery

A lithium secondary battery was manufactured by the same method as Embodiment example 2 except the cathode obtained in Comparative example 1 was used.

Evaluation Example 1: Capacity and Rate Measurement of Lithium Secondary Battery The lithium secondary batteries manufactured in Embodiment example 2 and Comparative example 2 were charged under a condition of current=0.1C up to 4.65V, and its capacity was measured. Subsequently, a discharge capacity was measured at current=0.1C up to 2.75V. These results are shown in the following Table 1.

TABLE 1

|  | Embodiment example 1 | Comparative example 1 |
| --- | --- | --- |
| First charge capacity (mAh/g) | 285.8 | 285.3 |
| First discharge capacity (mAh/g) | 238.0 | 228.9 |
| First efficiency (%) | 83.3 | 80.2 |

Also, a discharge capacity was measured at a rate of 0.1C, 0.5C, 1.0C, and 2.0C at an operating voltage from 2.75 to 4.45V. A discharge capacity at 0.5C is shown in FIGS. 2a and 2b.

Figure 2A:
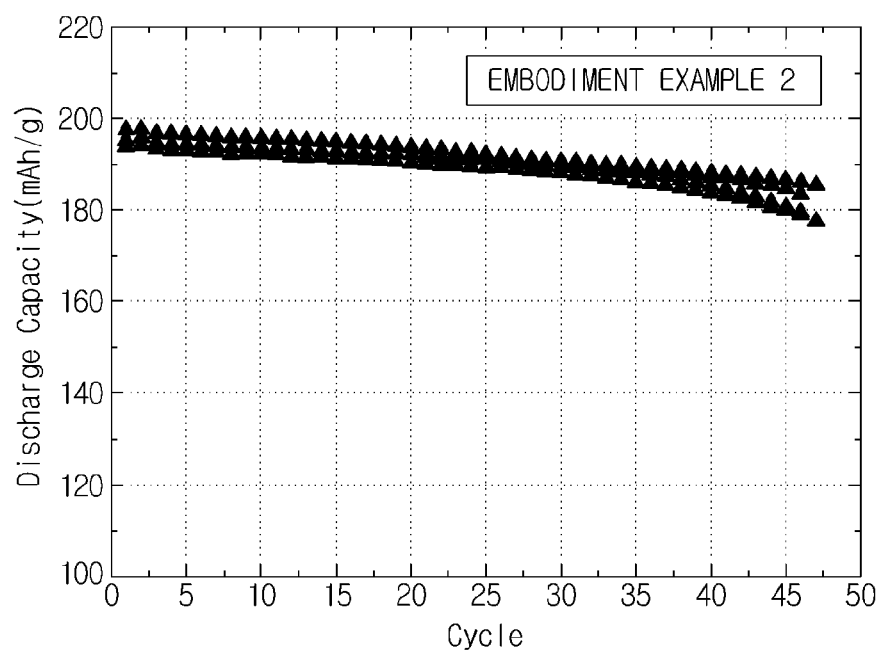
FIGS. 2a and 2b are discharge capacity vs cycle number graphs of lithium secondary batteries according to Embodiment example 2 and Comparative example 2, respectively.
Figure 2B:
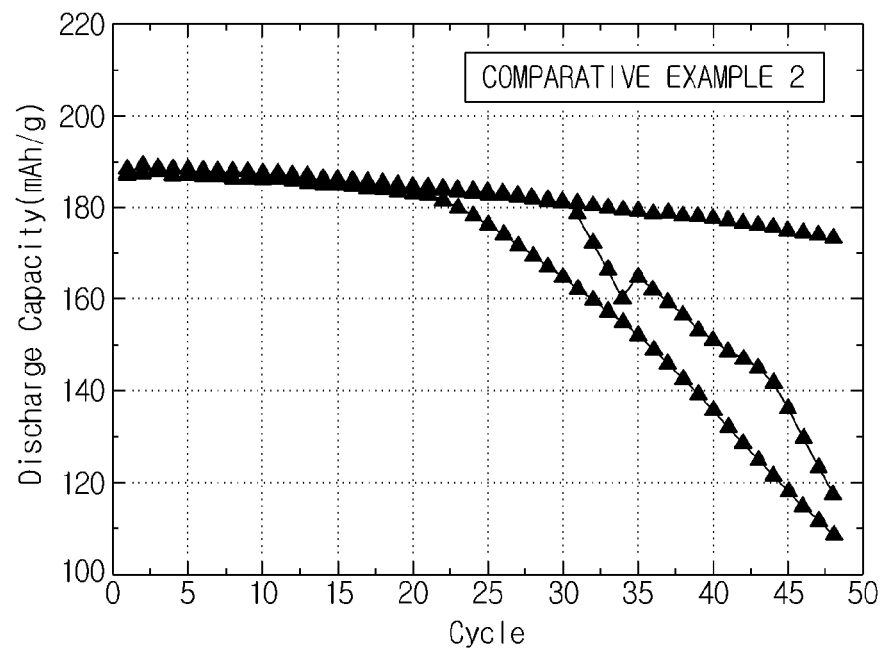

FIG. 2b is a triplicate experiment graph of a cell fabricated by the same method using a bare cathode active material manufactured by the same method, and it can be seen that even the cells using the same type of cathode active material show a significant discharge capacity difference. It is found that this big difference has occurred because the bare sample free of fluorine coating on the surface of the cathode active material is susceptible to surface exposure to an electrolyte solution, leading to a side reaction which accelerates the degradation, in particular, an electrolyte solution side reaction occurs more intensively at a certain partial zone of the cathode active material.

In contrast, it can be seen from a triplicate experiment graph, as illustrated in FIG. 2a, of the cell manufactured using the fluorine-coated cathode active material, that a capacity retention rate is higher than or equal to 92% even after about 50 cycles without any difference between cells. As seen in the SEM image, uniform coating formed on the surface protects the cathode active material well from an electrolyte solution and contributes to slow degradation even after tens of cycles.

Figure 3:
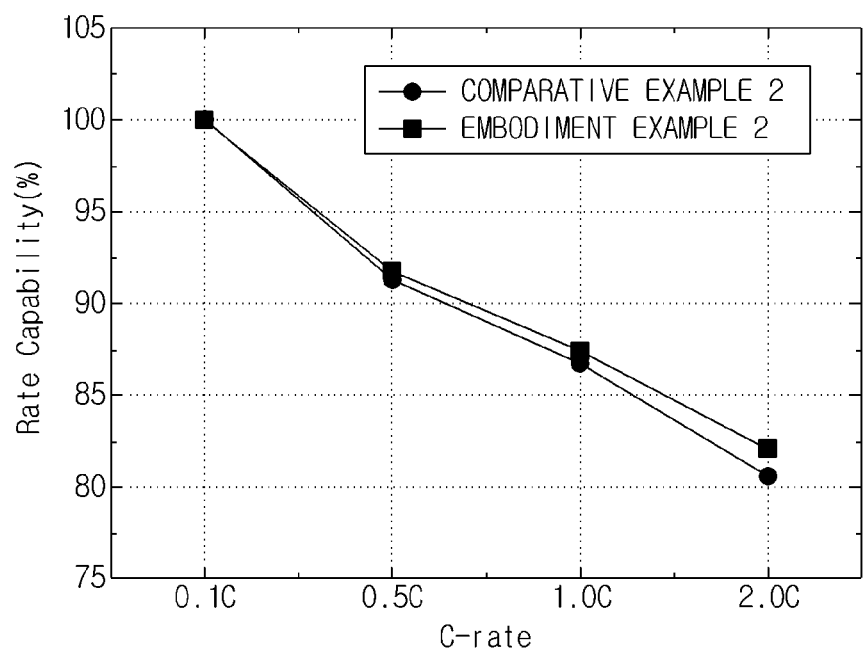
FIG. 3 is a rate capability vs C-rate graph for each of lithium secondary batteries according to Embodiment example 2 and Comparative example 2.

Also, rate capability of the battery cell exhibiting the highest discharge capacity in Comparative example 2 and the battery cell of Embodiment example 2 is shown in FIG. 3.

What is claimed is:

1. A cathode active material for a lithium secondary battery, wherein the cathode active material is represented by the following general formula 2:

$$Li_xNi_yMn_zCo_{1-y-z}M_\alpha O_2 \qquad \text{[General Formula 2]}$$

where z≥0.5, z>y, z>1-y-z≥0, 1.5≥x≥1, 0≤α≤1, and M is at least one metal selected from the group consisting of B, Li, Mg, Al, Ca, Sr, Cr, V, Ti, Fe, Co, Ni, Zr, Zn, Si, Y, Nb, Ga, Sn, Mo, W, and combinations thereof;

and wherein the cathode active material has a layered structure and a fluorine-coated surface, the fluorine-coated surface has a spinel-like phase, and the fluorine-coated surface is made by a compound comprising polyvinylidene fluoride (PVdF).

2. The cathode active material for a lithium secondary battery according to claim 1, wherein the cathode active material has a grain size of a longest diameter from 20 nm to 200 μm.

3. The cathode active material for a lithium secondary battery according to claim 1, wherein the fluorine-coated surface has a thickness from 2 nm to 20 μm.

4. The cathode active material for a lithium secondary battery according to claim 1, wherein a z/y value representing an Mn/Ni atomic ratio in the general formula 2 is 1<z/y≤20.

5. A cathode for a lithium secondary battery, manufactured from a cathode mix slurry including the cathode active material for a lithium secondary battery according to claim 1.

6. A lithium secondary battery comprising: a cathode, an anode, a separator interposed between the cathode and the anode, and an electrolyte solution, wherein the cathode is the cathode for a lithium secondary battery according to claim 5.

7. A battery module comprising the lithium secondary battery according to claim 6 as a unit cell.

8. A battery pack comprising the battery module according to claim 7.

9. A device comprising the battery pack according to claim 8, wherein the device is an electric vehicle, a hybrid electric vehicle, a plug-in electric vehicle, or an energy storage system.

10. A method for manufacturing the cathode active material of claim 1, the method comprising:
   (a) uniformly mixing a nickel compound, a manganese compound, and cobalt compound;
   (b) adding a lithium compound to a resultant of (a) and performing a baking treatment to obtain a layered lithium nickel-manganese-cobalt cathode active material; and
   (c) coating fluorine on a surface of the layered lithium nickel-manganese-cobalt cathode active material so that the fluorine coated surface has a spinel-like phase.

11. The method according to claim 10, wherein the fluorine coating is performed by a solid state reaction method using heat treatment, a spray drying method, or a vapor reaction method.

\* \* \* \* \*